United States Patent
Ramakrishnan et al.

(10) Patent No.: US 9,069,073 B2
(45) Date of Patent: Jun. 30, 2015

(54) REMOVING AND DE-WEIGHTING OUTLIER MEASUREMENTS FROM SATELLITE AND PREVIOUS INFORMATION

(75) Inventors: Sthanunathan Ramakrishnan, Bangalore (IN); Sandeep Rao, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 632 days.

(21) Appl. No.: 13/330,473

(22) Filed: Dec. 19, 2011

(65) Prior Publication Data

US 2013/0154879 A1 Jun. 20, 2013

(51) Int. Cl.
*G01S 19/42* (2010.01)
*G01S 19/20* (2010.01)

(52) U.S. Cl.
CPC ............ *G01S 19/426* (2013.01); *G01S 19/20* (2013.01)

(58) Field of Classification Search
CPC .......... G01S 19/20; G01S 19/40; G01S 19/42
USPC .......... 342/357.25, 357.23, 357.58; 701/469, 701/479, 480
See application file for complete search history.

(56) References Cited

U.S. PATENT DOCUMENTS

| | | | | |
|---|---|---|---|---|
| 5,760,737 A | * | 6/1998 | Brenner | 342/357.58 |
| 6,618,690 B1 | * | 9/2003 | Syrjarinne | 702/179 |
| 6,639,549 B2 | * | 10/2003 | Vanderwerf et al. | 342/357.58 |
| 2007/0139263 A1 | * | 6/2007 | Xie et al. | 342/357.02 |
| 2009/0254275 A1 | * | 10/2009 | Xie et al. | 701/213 |
| 2011/0084878 A1 | * | 4/2011 | Riley et al. | 342/357.58 |

* cited by examiner

*Primary Examiner* — Harry Liu (74) *Attorney, Agent, or Firm* — Lawrence J. Bassuk; Frank D. Cimino (57) ABSTRACT

Methods and integrated circuits for performing receiver autonomous integrity monitoring (RAIM) in global navigation satellite system (GNSS) receivers are disclosed. In an embodiment, a first information comprising current position related information is accessed. A second information comprising predicted position related information is accessed based on previously received information. A solution is computed based on the first information and the second information and a presence of outlier information is determined in at least one of the first information and the second information based on the solution.

5 Claims, 7 Drawing Sheets

REMOVING AND DE-WEIGHTING OUTLIER MEASUREMENTS FROM SATELLITE AND PREVIOUS INFORMATION

TECHNICAL FIELD

Embodiments of the disclosure relate to information integrity monitoring.

BACKGROUND

In accordance with an exemplary scenario, global navigation satellite systems (GNSS) may be broadly defined to include GPS, Galileo, GLONASS, Beidou, IRNSS, QZSS and other positioning technologies using signals from satellites, with or without augmentation from terrestrial sources. Information from GNSS may be used to compute a user's position information (e.g., a location, a speed, a direction of travel, etc.).

In one exemplary scenario, a GNSS receiver autonomously evaluates the integrity of the information it receives from different GNSS satellites by a process referred to as "receiver autonomous integrity monitoring" (RAIM). Evaluating the integrity of the information involves, for example, checking whether the information received from a GNSS satellite is relatively free of errors, such as those errors introduced on account of a multipath effect, and removing erroneous information from the computation implemented to determine the position information.

In an exemplary scenario, the information received from GNSS satellites may be affected by multipath effect, especially in areas such as urban canyons, wherein an "urban canyon" may be defined as an area characterized by narrow lanes with tall structures, such as man-made buildings, on both sides. The information sent by the GNSS satellites may bounce off of, or be reflected from, one or more surfaces before being received by the GNSS receiver. As a result of the multiple paths travelled or encountered by the information, an accuracy of the information to be utilized in the computation of the position information may be compromised.

For the detection of a multipath error in the received information, and the subsequent removal of such information, to be accomplished, the information has to be received from at least five or six GNSS satellites, respectively. In urban canyons, it may be difficult to receive information from such a high number of GNSS satellites, as the visibility of GNSS satellites may be quite low in such areas.

SUMMARY

Methods and integrated circuits for performing information integrity monitoring in global navigation satellite system (GNSS) receivers are disclosed. The process of evaluating integrity of information received by GNSS receivers is also referred to as "receiver autonomous integrity monitoring" (RAIM). The RAIM may be performed by identifying relatively erroneous information from among the information received from currently visible GNSS satellites and predicted information (for example, Kalman filter prediction for a current position estimate) and removing/de-weighting the relatively erroneous information from the computation implemented to determine current position information.

In one embodiment, a method includes accessing a first information comprising current position related information. In an example embodiment, the first information received from a plurality of GNSS satellites may be accessed. In an example embodiment, the position related information refers to information relating to a range information and a velocity information (for example, information including a consideration for Doppler effect) from the plurality of GNSS satellites. The method further includes accessing a second information comprising predicted position related information based on previously received information. In an example embodiment, the predicted position related information includes a Kalman filter (KF) prediction based on the previously received information from the plurality of GNSS satellites. A solution is computed based on the first information and the second information. A presence of outlier information is determined in at least one of the first information and the second information based on the solution. A position information (for example, current position and velocity) is determined based on at least one of the first information and the second information on removing/de-weighting the outlier information from the first information and the second information.

In an embodiment, measurements are obtained from the first information and the second information. In an example embodiment, each measurement of the measurements obtained from the first information corresponds to received information from a GNSS satellite from among the plurality of GNSS satellites. A primary set of measurements is configured to include at least one measurement obtained from the first information and at least one information obtained from the second information. The solution is computed from the primary set of measurements obtained from the first information and the second information. A plurality of metrics for each measurement of the primary set of measurements is computed based on the solution. The presence of the outlier information is determined by determining a presence of an outlier measurement in the primary set of measurements based on the plurality of metrics associated with the each measurement.

In an example embodiment, determining the presence of the outlier measurement includes preparing a list of measurements, which comprise error (for example, a multipath error, a bias error and the like) from the primary set of measurements based on the plurality of metrics. At least one measurement is removed from the list of measurements based on a first predefined criterion. In an example embodiment, the first predefined criterion for removing the at least one measurement from the list of measurements is presence of a predefined measure of multipath error in a measurement of the list of measurements. In an example embodiment, the predefined measure may be a negative estimate of multipath error in a measurement obtained from the first information. A measurement is selected as the outlier measurement from remaining measurements in the list of measurements based on one of a maximum likelihood of error if metrics associated with the remaining measurements satisfy a second predefined criterion, and, a maximum estimate of error if metrics associated with the remaining measurements do not satisfy the second predefined criterion. In an example embodiment, selecting the measurement as the outlier measurement further includes checking if an estimate of error of the measurement is greater than a predefined threshold if the selected measurement is obtained from the first information.

In an example embodiment, a secondary set of measurements is configured by removing the outlier measurement from the primary set of measurements if the measurement is obtained from the first information, and, de-weighting the outlier measurement in the primary set of measurements if the measurement is obtained from the second information. The de-weighting of the outlier measurement is performed if the remaining measurements in the primary set of measurements comprise a predefined threshold estimate of the error.

An outlier measurement is similarly determined among the secondary set of measurements and removed/de-weighted from the set of measurements. The process may be repeated until all outlier measurements (within an predefined acceptable threshold) are accounted for. In an example embodiment, the outlier measurements corresponding to range information are first determined, followed by determination of outlier measurements corresponding to velocity information. The outlier measurements corresponding to the range information and velocity information may be removed/de-weighted prior to determining the position information based on the remaining measurements.

In an example embodiment, an integrated circuit is provided for performing information integrity monitoring. In an embodiment, the integrated circuit includes a signal receiving module configured to receive a first information comprising current position related information from a plurality of global navigation satellite system (GNSS) satellites. The integrated circuit further includes a prediction module configured to provide a second information comprising predicted position related information based on previously received information, and, a processor configured to compute a solution based on the first information and the second information and determine a presence of outlier information in at least one of the first information and the second information based on the solution.

In an example embodiment, a computer-readable medium is provided for performing information integrity monitoring. The computer-readable medium is configured to store a set of instructions that when executed cause a computer to perform a method. In an embodiment, the method includes accessing a first information comprising current position related information from a plurality of global navigation satellite system (GNSS) satellites, and, accessing a second information comprising predicted position related information based on previously received information. The method further includes obtaining measurements from each of the first information and the second information. Each measurement of the measurements obtained from the first information corresponds to received information from a GNSS satellite of the plurality of GNSS satellites. A solution is computed based on at least one measurement obtained from each of the first information and the second information and a presence of outlier information corresponding to range information and velocity information is determined in at least one of the first information and the second information based on the solution. The method further includes determining position information based on one of removing and de-weighting the outlier information.

DETAILED DESCRIPTION

In accordance with an exemplary scenario, GNSS RAIM performance may deteriorate, especially in areas like urban canyons and blockages as a result of a multipath error and a low number of visible GNSS satellites. An example of an urban canyon may be an area characterized by narrow lanes with tall structures, such as man-made buildings, on both sides. Examples of blockage may include tunnel areas, parking lots and the like. Various embodiments of the present technology, however, provide apparatuses, systems and methods for performing RAIM in GNSS receivers that are capable of overcoming these and other limitations and providing additional benefits.

The following description and accompanying figures demonstrate that the present technology may be practiced or otherwise implemented in a variety of different embodiments. It is noted, however, that the scope of the present technology is not limited to any or all of the specifically disclosed embodiments. Indeed, one or more of the devices, features, operations, processes, characteristics, or other qualities of a specifically disclosed embodiment may be removed, replaced, added to, or changed.

Figure 1:
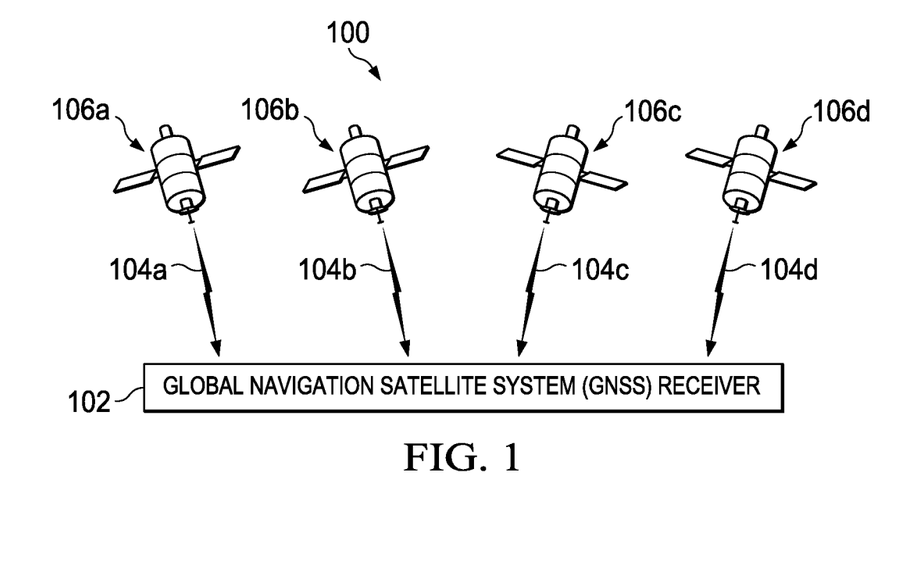
FIG. 1 is a network diagram depicting global navigation satellite system (GNSS) satellites and a GNSS receiver according to an exemplary scenario.

FIG. 1 is a network diagram 100 depicting global navigation satellite system (GNSS) satellites and a GNSS receiver. The network diagram 100 depicts a GNSS receiver 102 that is configured to receive satellite signals from a plurality of GNSS satellites. For instance, the GNSS receiver 102 may receive a satellite signal 104a from a GNSS satellite 106a, a satellite signal 104b from a GNSS satellite 106b, a satellite signal 104c from a GNSS satellite 106c and a satellite signal 104d from a GNSS satellite 106d. The plurality of GNSS satellites may hereinafter be collectively referred to as "GNSS satellites" and the satellite signals, such as satellite signal 104a, 104b, 104c and 104d, may be hereinafter collectively referred to as GNSS satellite signals. The GNSS satellites may be man-made earth orbiting devices used for receiving and/or transmitting signals, which may include global positioning satellite signals, through transponders of the man-made earth-orbiting device. Though FIG. 1 depicts the GNSS receiver 102 as receiving the GNSS satellite signals from only four GNSS satellites, the GNSS receiver 102 may receive GNSS satellite signals from, for example, multiple satellites belonging to multiple satellite systems, such as a global positioning system (GPS), a Global'naya Navigatsionnaya Sputnikovaya Sistema (GLONASS) satellite system, a Galileo satellite system and the like, and those are commonly referred to as GNSS.

A received signal at the GNSS receiver 102 may contain multiple transmitted GNSS satellite signals. To obtain the information from the respective transmitted GNSS satellite signals, the GNSS receiver 102 may perform a signal acquisition/tracking procedure. More specifically, the GNSS receiver 102 may search for the corresponding transmitted GNSS satellite signal in the received signal. The search may be performed based on a Pseudorandom Noise (PN) code that is unique to each GNSS satellite. For example, in GPS, each GNSS satellite may repeatedly transmit a unique, 1023 bit PN code having a duration of 1 millisecond (ms). The GNSS satellites may also transmit a data bit every 20 ms by modulating (multiplying by +1/−1) the 20 consecutive PN codes. The GNSS receiver 102 may generate local signals (at baseband) and modulate each local signal with the unique code corresponding to the each GNSS satellite to produce replica local signals. The received signal may then be correlated, (for e.g., matched), with the replica local signals to detect a presence of corresponding GNSS satellite signals in the received signal. Upon detecting a presence of a particular GNSS satellite signal (e.g., GNSS satellite signal 104*a*), the GNSS receiver 102 may lock onto the GNSS satellite signal for subsequent tracking of the corresponding GNSS satellite (e.g., GNSS satellite 106*a*) so as to receive satellite information. After locking onto or acquiring a minimum of four GNSS satellites, the GNSS receiver 102 may compute a user position by triangulation. The computation of the user position may include one or more of a number of operations that are not discussed herein for the sake of brevity.

The information received from the plurality of GNSS satellites may be affected by a multipath bias. For example, the information may encounter an obstruction on its way to the GNSS receiver 102 and then reach the GNSS receiver 102 upon reflection from one or more such obstructions. The satellite information received at the GNSS receiver 102 in such a manner may not accurately convey distance information to the satellite on account of the additional path traveled due to the obstructions and may be said to have a multipath bias in the received satellite information. The affect of the multipath bias may especially be encountered in areas like urban canyons. An urban canyon may be an area characterized by narrow lanes with tall structures, such as those of tall buildings, on both sides. An example of an urban canyon may be an industrial hub, a business hub, a downtown area and the like.

The GNSS receiver 102 may be configured to autonomously evaluate the integrity of the satellite information that it receives from the plurality of GNSS satellites. The process of evaluating the integrity of the received information is referred to as receiver autonomous integrity monitoring (RAIM). The RAIM process may involve detecting and removing erroneous information received from the GNSS satellites. In an example embodiment, RAIM may be performed to account for multipath bias in the received information from the GNSS satellites. A method for performing RAIM is explained in FIG. 2A.

Figure 2A:
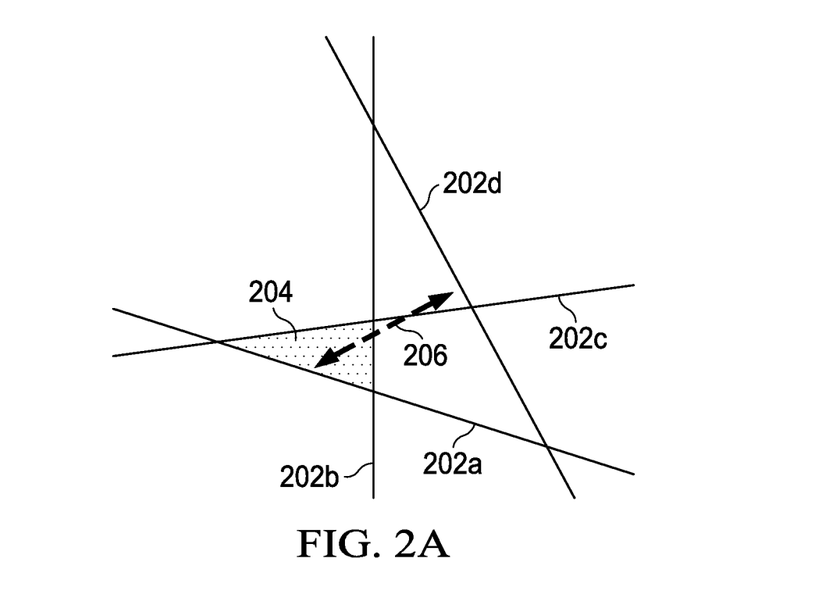
FIG. 2A illustrates a weighted least square (WLS) RAIM method for performing RAIM by a GNSS receiver according to an exemplary scenario.

FIG. 2A illustrates a weighted least square (WLS) RAIM method for performing RAIM by a GNSS receiver, such as the GNSS receiver 102, according to an exemplary scenario. The WLS RAIM method may be used for obtaining an initial estimate of position information by computing pseudo-range measurements from range information received from the GNSS satellites. A pseudo-range measurement is a distance between a GNSS receiver and a GNSS satellite that is measured at the time-of-arrival. The pseudo-range measurement from each GNSS satellite may be represented as a sphere around the GNSS satellite from which the information is received by the GNSS receiver. The intersection of the different spheres may provide an indication of the position information of the GNSS receiver. Such a non-linear method of obtaining the position information may be linearized (for example, by drawing tangents to the spheres at the point of intersection) in order to obtain position information. Accordingly, the linearized form of pseudo-range information received from four GNSS satellites is depicted in FIG. 2A. The lines 202*a*, 202*b*, 202*c* and 202*d* depict a linearized form of pseudo-range measurements from four GNSS satellites, such as the GNSS satellites 106*a*-106*d*. The WLS RAIM method may follow a range consensus technique that involves checking for consensus among the information received from different GNSS satellites and identifying relatively erroneous information (hereinafter referred to as the outlier information). The GNSS receiver 102 may ignore/remove the information received from the GNSS satellite corresponding to the outlier information during its computation of a current position and velocity.

In FIG. 2A, the lines 202*a*, 202*b* and 202*c*, which represent the information received from three GNSS satellites seem to converge on the area 204, thereby indicating an area of consensus among the information received from three GNSS satellites corresponding to the lines 202*a*, 202*b* and 202*c*. The line 202*d* seems to be located relatively far from the area 204, and the GNSS satellite corresponding to the line 202*d* may be identified as the outlier GNSS satellite. A dotted-arrow line 206, which is drawn orthogonal to the line 202*d* from the centroid of the area 204 (which represents the solution in an exemplary embodiment), provides an indication of an error, such as a multipath bias, in the pseudo-range information received from the GNSS satellite corresponding to the line 202*d*. The WLS RAIM may also utilize a fault detection, isolation and correction (FDIC) technique to remove an outlier measurement from a given set of measurements received from or associated with a plurality of GNSS satellites, and the FDIC may repeatedly be performed until all outlier measurements are removed.

In order to estimate position information, the GNSS receiver may need to solve for three position variables and one clock variable. Under certain conditions, the GNSS receiver 102 utilizes information in the form of pseudo-range measurements from at least four GNSS satellites in order to solve for the four variables. However, for the detection of a multipath error in the received information and the subsequent removal of the outlier information, the information is to be received from at least five and six GNSS satellites, respectively. In urban canyons areas, it may be difficult to receive information from such a high number of GNSS satellites, as the visibility of GNSS satellites may be quite low in such areas. An exemplary GNSS receiver performance for obtaining position information based on WLS RAIM is depicted in FIG. 2B.

Figure 2B:
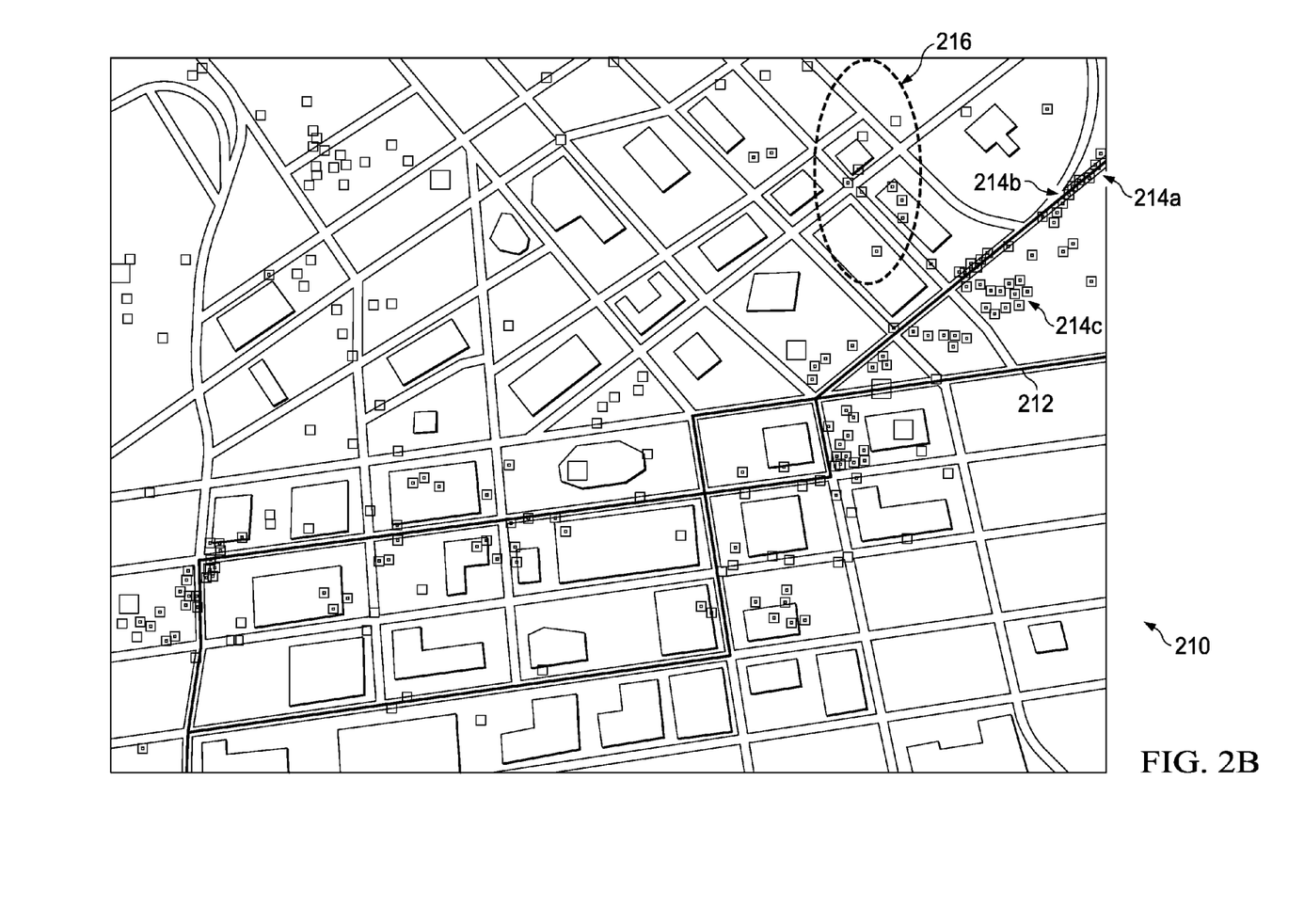
FIG. 2B depicts an arial view of an urban canyon area for illustrating GNSS receiver performance based on WLS RAIM according to an exemplary scenario.

FIG. 2B depicts an arial view 210 of an urban canyon area that illustrates GNSS receiver performance based on WLS RAIM according to an exemplary scenario. In FIG. 2B, a path traversed by the GNSS receiver (among the network of crisscross roads) is depicted by line 212. The position information obtained concurrently during the traversing of the path is depicted by measurements, such as measurement 214*a*, 214*b* and 214*c*. As can be seen from the FIG. 2B, the GNSS receiver performance is quite poor, as is highlighted by a number of outlier measurements (e.g., measurements located further away from the traversed path), such as those depicted by position measurements included in circle 216.

As explained in FIGS. 2A and 2B, and pursuant to an exemplary scenario, the WLS RAIM relies upon information received from currently visible satellites and does not use any information received in the past from the plurality of GNSS satellites. As a result, when the visibility of satellites is low, such as in areas like urban canyons or in blockages (such as tunnel areas or parking lots), or when the information received from one or more satellites is affected by a multipath error, an effectiveness of WLS RAIM may be affected. An exemplary GNSS receiver performance utilizing information received in the past from the plurality of GNSS satellites is explained in FIG. 3A.

Figure 3A:
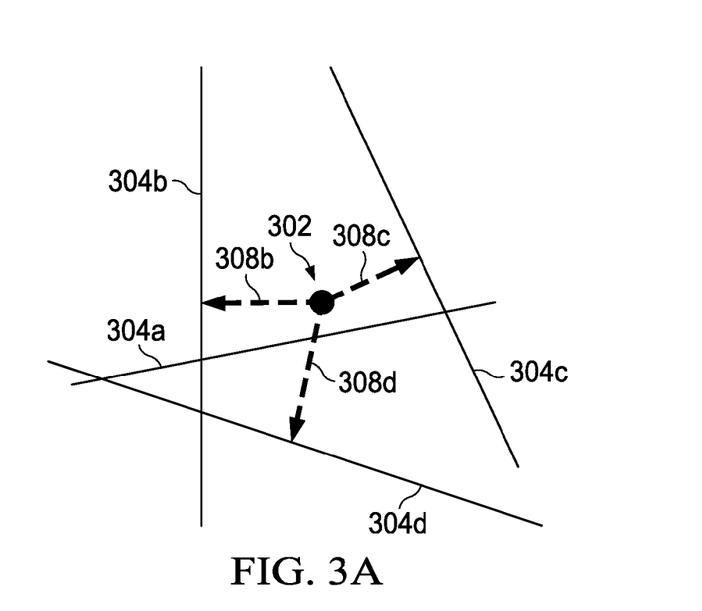
FIG. 3A illustrates a Kalman Filter (KF) RAIM method for performing RAIM by a GNSS receiver according to an exemplary scenario.

FIG. 3A illustrates a Kalman filter (KF) RAIM method for performing RAIM by a GNSS receiver, such as the GNSS receiver 102, according to an exemplary scenario. A KF filters information received from GNSS satellites across time and provides prediction of current and future estimates of position and velocity. In FIG. 3A, point 302 represents the KF prediction for current position information. The predicted position is considered ideal and all received information from the GNSS satellites is weighed against the KF prediction to determine outlier information among the received information. The lines 304a, 304b, 304c and 304d depict a linearized form of pseudo-range measurements from four GNSS satellites, such as the GNSS satellites 106a-106d. The KF RAIM uses the predicted position represented by point 302 as ideal and detects outlier measurements among the current set of GNSS satellite measurements depicted by lines 304a-304d. The line 304a at the shortest distance from the predicted position may be considered as a concurring measurement, and measurements represented by lines 304b-304d that are farther from the predicted position 302 may be identified as outlier measurements. Lines 308b-308d, which are drawn orthogonal to the lines 304b-304d, respectively, from the predicted position 302, may provide an indication of an error, such as a bias error, in the pseudo-range information received from the GNSS satellite corresponding to the lines 308b-308d. The KF RAIM may remove the outlier measurements and utilize the concurring measurements for correction of existing position information and prediction of future position information. However, if the KF prediction (represented by the point 302) is inaccurate then it may lead to an avalanche effect where all relevant information from the GNSS satellites is discarded, thereby resulting in rapidly deteriorating current position information.

Figure 3B:
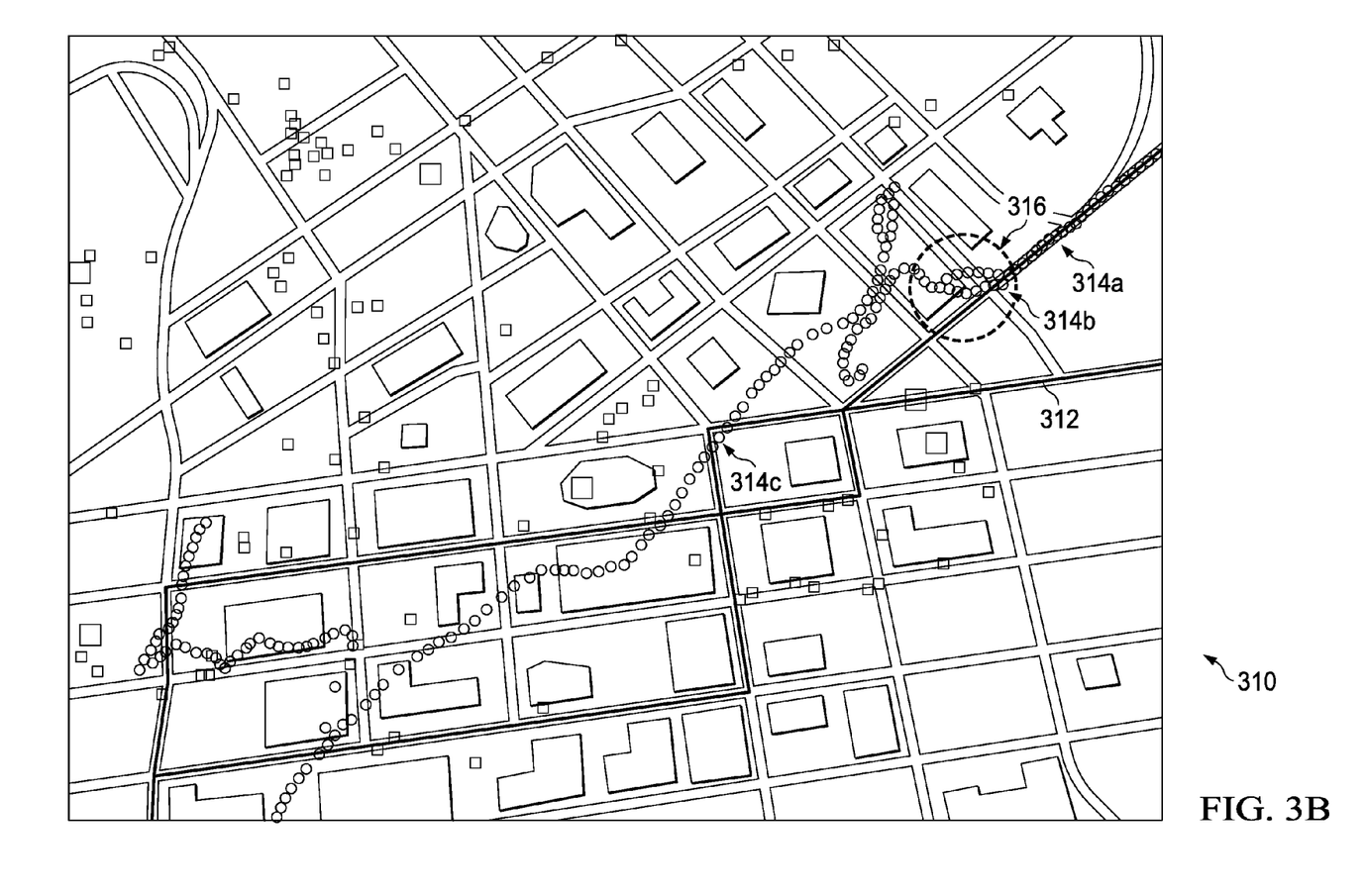
FIG. 3B depicts an arial view of an urban canyon area for illustrating GNSS receiver performance based on KF RAIM according to an exemplary scenario.

FIG. 3B depicts an arial view 310 of an urban canyon area that illustrates GNSS receiver performance based on KF RAIM, in accordance with an exemplary scenario. In FIG. 3B, the path traversed by the GNSS receiver is depicted by line 312. The position information obtained concurrently during the traversing of the path is depicted by circles, such as circle 314a, 314b and 314c. As can be seen from FIG. 3B, if the KF prediction is inaccurate (for example, for reasons such as a narrowing of bandwidth of the KF filter resulting in an output trailing input), then there is avalanche effect and the GNSS receiver performance deteriorates quite rapidly as depicted by the area marked by sphere 316, which indicates the beginning of the avalanche effect including a number of outlier measurements (e.g., measurements located further away from the traversed path).

As explained in FIGS. 3A and 3B, the KF RAIM relies only upon information received in the past from the GNSS satellites and checks information received from the currently visible satellites with respect to the predicted position based on the past information. As a result, when the KF prediction is wrong, relatively error-free information received from the currently visible GNSS satellites may be discarded, thereby resulting in rapidly deteriorating position information, and, consequently an effectiveness of KF RAIM may be affected. An alternative to relying solely on received information from the currently visible GNSS satellites (for example, in WLS RAIM) or on information received in the past from the GNSS satellites (for example, in KF RAIM) for performing RAIM in GNSS receivers is discussed in accordance with an embodiment in FIG. 4.

Figure 4:
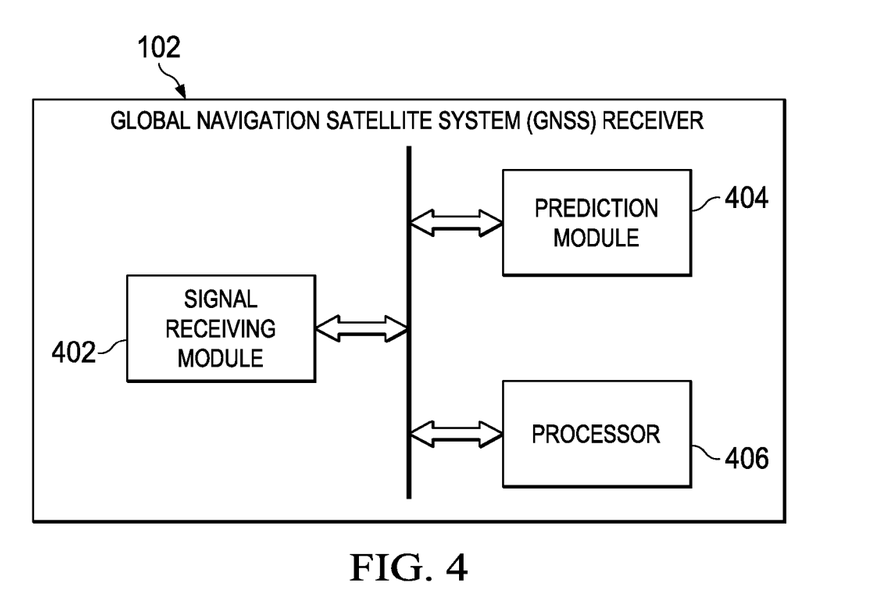
FIG. 4 is a block diagram of a GNSS receiver, according to an embodiment.

FIG. 4 is a block diagram of the GNSS receiver 102, according to one embodiment. Particularly, FIG. 4 illustrates internal circuitry of the GNSS receiver 102 in the form of an integrated circuit including a signal receiving module 402, a prediction module 404 and a processor 406, according to one embodiment. The details of the diagram are provided merely by way of illustration, and other embodiments may contain fewer or more components and corresponding interconnections.

The information from the plurality of GNSS satellites may be received in the form of a signal. A received signal at the GNSS receiver 102 contains one or more of the transmitted GNSS signals. To obtain the information from the respective transmitted signals, the GNSS receiver 102 may perform a signal acquisition/tracking procedure. More specifically, the GNSS receiver 102 may be configured to search for the corresponding transmitted signals in the received signal and then lock onto them for subsequent tracking of the corresponding satellites so as to receive the satellite information. The signal acquisition/tracking procedure often entails correlating the received signal (typically down-converted to baseband) with a corresponding local signal generated within the GNSS receiver 102. Accordingly, the GNSS receiver 102 may include components, such as, for example, a front end preprocessor, an analog-to-digital converter (ADC), a decimation and filtering block, a quantization block and a correlator engine, such that various functions of the GNSS receiver 102 may be performed. However, for the purposes of illustration in FIG. 4, the internal circuitry of the GNSS receiver 102 is integrated in the form of an integrated circuit, wherein the GNSS receiver 102 is depicted as including the signal receiving module 402, the prediction module 404 and the processor 406.

In one embodiment, the signal receiving module 402 is configured to receive a first information corresponding to current position related information from a plurality of GNSS satellites, such as the GNSS satellites 106a-106d. In an example embodiment, the signal receiving module 402 is an antenna. The information may be received from multiple satellite signals from GNSS satellites (not shown) in one or more satellite systems, such as GPS, GLONASS, Galileo and the like. In one example embodiment, the first information may include the position related information in the form of range information and velocity information from each GNSS satellite from among the plurality of GNSS satellites.

In one embodiment, the prediction module 404 is configured to provide a second information comprising predicted position related information based on previously received information. In an example embodiment, the predicted position related information comprises a Kalman filter (KF) prediction based on previously received information from the plurality of GNSS satellites. In one embodiment, the predicted position information may include information regarding a current estimate of position and velocity. In one embodiment, however, the predicted position information may be available through other techniques, such as when a particle filter is implemented.

In one embodiment, the processor 406 is configured to determine position information based on at least one of the first information and the second information. In one example embodiment, the position information includes information regarding current position and velocity of a user of the GNSS receiver 102.

In an example embodiment, the processor 406 is further configured to obtain measurements from each of the first information and the second information. In one embodiment, each measurement of the measurements obtained from the first information corresponds to received information from a GNSS satellite from among the plurality of GNSS satellites. As explained in FIG. 2, the information received from the GNSS satellites can be linearized (e.g., expressed in the form of a linear equation) so as to obtain the measurements from the first information. In an example embodiment, the range information received from each GNSS satellite is linearized around the predicted position information, such as the current KF prediction, to thereby obtain measurements pertaining to residuals as depicted below:

$$\Delta\rho(n)=H\Delta X+w(n)$$

where $\Delta\rho$ is the residual pseudo-range, H is a matrix that relates the predicted position information to the range information and represents the geometry of the satellite constellation as seen from the user location, $\Delta X$ is a difference between an estimated position based on relevant information and a measurement received from a GNSS satellite, and $w(n)$ is the measurement noise.

Though the linearized form of the information is depicted for the range information, it is noted that similar equations may be configured for velocity (e.g., Doppler) information for each GNSS satellite. Each measurement (in form of range or velocity) obtained from the first information corresponds to received information from a GNSS satellite from among the plurality of GNSS satellites. For example, if the GNSS receiver receives information from four GNSS satellites, then four measurements may be constructed for each of the range and velocity information.

The information included in the second information, such as a KF prediction, may similarly be linearized to obtain measurements from the second information. In an example embodiment, an eight state Kalman filter may be depicted as:

$$X = [x\ y\ z\ t_{clk}\ v_x\ v_y\ v_z\ f_{clk}]$$

with four states (three position states x, y and z and one clock state $t_{clk}$ for range information and four states (three vector states $v_x\ v_y$ and $v_z$ and one clock state $f_{clk}$) for velocity information. Accordingly, four measurements for each of the range information and the velocity information may be obtained by linearizing the range information and velocity information as:

$$0 = I\Delta X + w_{pred}(n)$$

where I is the identity matrix and $w_{pred}(n)$ is the predicted measurement noise Since the range and the velocity information are linearized around the KF prediction, the residual for the second information would be zero as depicted above.

In one embodiment, the processor 406 is further configured to form a primary set of measurements including at least one measurement from among the measurements obtained from the first information and at least one measurement from among the measurements obtained from the second information. In an example embodiment, the processor 406 is configured to include measurements corresponding to only range information from the first information and the second information to form the primary set of measurements. In another example embodiment, the processor 406 is configured to include measurements corresponding to velocity information from the first information and the second information so as to form the primary set of measurements.

For example, if the first information includes four measurements for range information (corresponding to information received from four GNSS satellites) and the second information includes four measurements (corresponding to the four states for range information), then the primary set of measurements obtained by augmenting the measurements will include eight measurements. The primary set of measurements may similarly be configured for the velocity information. In an example embodiment, the primary set of measurements obtained from the first information and the second information may be represented as:

$$\begin{bmatrix} \Delta\rho(n) \\ 0 \end{bmatrix} = \begin{bmatrix} H \\ I \end{bmatrix} \Delta X(n) + \begin{bmatrix} w(n) \\ w_{pred}(n) \end{bmatrix}$$

multiplying both sides by W, the inverse of square root of the extended noise co-variance matrix we get $$W = \left(\sqrt{E\left(\begin{bmatrix} w(n) \\ w_{pred}(n) \end{bmatrix} \begin{bmatrix} w^T(n) & w_{pred}^T(n) \end{bmatrix}\right)}\right)^{-1}$$

$$= \left(\sqrt{\begin{bmatrix} R & 0 \\ 0 & R_{pred} \end{bmatrix}}\right)^{-1}$$

Multiplying both sides by W, we get, $$\rho_{ext}(n) = H_{ext}\Delta X(n) + w_{ext}^{normalized}(n)$$

where R and $R_{pred}$ are the covariance matrices of measurement noise and error in the prediction from KF, $\rho_{ext}$ is the weighted pseudo-range/Doppler, $H_{ext}$ is the weighted extended H matrix and $w_{ext}^{normalized}(n)$ is the weighted noise, whose power is unity.

The augmented measurements configuring the primary set of measurements may be considered as an extended form of WLS RAIM, and a fault detection, isolation and correction (FDIC) algorithm may be utilized to perform RAIM, such as, for example, by removing outlier measurements. In an example embodiment, the primary set of measurements is first configured for information corresponding to the range information and outlier measurements are removed/de-weighted from the primary set of measurements. Pursuant to one embodiment, the process of performing RAIM for the range information is referred to as position RAIM. Moreover, in an example embodiment, upon performing position RAIM, the primary set of measurements are then configured for information corresponding to the velocity information and outlier measurements are removed/de-weighted from the primary set of measurements. In an embodiment, the process of performing RAIM for the velocity information is referred to as velocity RAIM. The determination and subsequent removal/de-weighting of the outlier information in form of measurements from the primary set of measurements is explained with respect to position RAIM. However, it is noted that a similar process may be repeated for velocity RAIM.

Removal/de-weighting of the outlier measurements from the primary set of measurements includes, pursuant to one embodiment, computing a solution by the processor 406 based on the primary set of measurements utilizing the WLS (Weighted Least Squares) algorithm as follows:

$$\Delta\hat{X} = (H'_{ext}H_{ext})^{-1}H'_{ext}\rho_{ext}$$

The WLS algorithm for computation of the solution is not explained in depth for the sake of brevity. In an example embodiment, the solution represents an interim solution for position information based on information (the first information and the second information) prior to removal/de-weighting of the outlier measurements.

It is noted that although various embodiments explained above suggest the utilization of all measurements obtained from the first information and the second information to arrive at the solution using the WLS algorithm, however various other techniques utilizing some of the measurements, but not others, may be utilized far computing the solution. For example, in some embodiments, algorithms such as the range consensus algorithm may be utilized, wherein only some measurements (for example two out of four measurements) from the first information and all measurements from the second information may be utilized in computing the solution. Upon computing the solution, the remaining measurements not included in the computation of the solution are compared with the solution for consensus, and outlier information is determined based on dissenting information in the remaining measurements. Different sets of measurements from the first information may be included in the computation of the solution and outlier information is determined for each such operation. A set of measurements corresponding to the least amount of dissenting information may be utilized to compute the solution.

In one embodiment, the processor 406 is configured to compute a fault vector 'f' from the solution. The fault vector f may be computed for each measurement in the primary set of measurements and is the residual between the solution and the measurement which is computed as follows:

$$f = \rho_{ext} - H_{ext}\Delta\hat{X}$$

$$f = (I - H_{ext}(H'_{ext}H_{ext})^{-1}H'_{ext})\rho_{ext} = S\rho_{ext}$$

where $S = I - H_{ext}(H'_{ext}H_{ext})^{-1}H'_{ext}$

In an example embodiment, the processor 406 may be configured to compute a metric 's' for determining a presence of a multipath error in the primary set of measurements. The metric s is computed as follows:

$$s = f^T * f$$

If there is no multipath and if the estimates of the noise covariance matrix are correct, then the metric s can be shown to be chi-square distributed with degrees of freedom=number of measurements−number of variables. If the metric s is less than a chi-square threshold dependent on the number of degrees of freedom, then it may be determined (or predicted with a high degree of confidence) that a measurement has no multipath error. However, if the metric s is greater than the chi-square threshold then it is determined that the measurement has a multipath error.

In one embodiment, the processor 406 is configured to compute a plurality of metrics for each measurement of the primary set of measurements based on the solution. In an example embodiment, the processor 406 may be configured to compute a metric in the form of a multipath bias estimate, denoted by b, for each measurement in the primary set of measurements so as to determine an estimate of the error, such as, for example, a multipath error, in a measurement if the measurement comprises the multipath error. The metric b is computed as follows:

$$b \triangleq f./\text{diag}(S)./\text{diag}(W)$$

Where diag(S) and diag(W) indicate the vector of principal diagonal of matrices S and W respectively, and ./ indicates element-by-element division. The W matrix is an inverse of the square root of the noise covariance matrix described above.

In an example embodiment, the processor 406 may be configured to compute a metric in the form of a maximum likelihood metric, denoted by m, for each measurement in the primary set of measurements so as to determine a likelihood of error, such as, for example, a multipath error, in a measurement. The metric m is computed as follows:

$$m \triangleq f.^2./\text{diag}(S)$$

Where diag(S) indicates the vector of principal diagonal of matrix S, ./ indicates element by element division, ^2 indicates an element by element squaring operation and the S matrix is derived as described above in conjunction with the fault vector 'f' computation.

In one embodiment, the processor 406 is configured to determine the presence of the outlier information by determining a presence of an outlier measurement in the primary set of measurements based on the plurality of metrics, such as the metric s and metrics b and m associated with each measurement. In an example embodiment, determining the presence of the outlier measurement may include preparing a list of measurements, which comprise a multipath error from the primary set of measurements based on the plurality of metrics. Accordingly, the metric s may be checked to prepare the list of measurements in order to determine a presence of a multipath error among the primary set of measurements.

In an example embodiment, at least one measurement is removed from the list of measurements based on a first predefined criterion. Removing at least one measurement from the list of measurements may also be considered to be a pre-screening of the measurements in the list. The list of measurements is prepared to determine the presence of an outlier measurement and as such includes measurements considered to be relatively erroneous. Pre-screening of the measurements may be performed so as to remove any measurement perceived as a non-outlier measurement (e.g., a measurement relatively free from error) from the list of measurements and as such precluded from the processing implemented to determine the outlier measurement.

In an example embodiment, a pre-screening of the first information may be performed and the non-concurring measurements may be provided for further processing and determination of outlier information. For example, pre-screening may use the fact that real multipath causes an increase in pseudo-range, and that very weak carrier-to-noise ratio (CNo) signals are suspect, as they could be caused by reflections. Also, in non-blockage conditions, measurements from the second information may be considered for removal if the bias estimate of the second information indicates that the potential error in the KF prediction is relatively high. The removal of at least one measurement from the list of measurements is further explained below.

In an example embodiment, the first predefined criterion for removing the at least one measurement from the list of measurements is a presence of a predefined measure of a multipath error in a measurement of the list of measurements. In an example embodiment, the predefined measure may be a negative multipath bias estimate for a measurement in the list of measurements. Since real multipath errors can increase a pseudo-range, a measurement with a negative multipath bias estimate in the list of measurements may be removed from the list as a non-outlier measurement.

In an example embodiment, the predefined measure may be a CNo greater than a threshold for a pre-determined estimate of a multipath bias estimate. Accordingly, measurements from the first information whose CNo is lesser than a threshold are included in the list of measurements. In one embodiment, the CNo threshold is currently set to 33 decibels (dB) in blockage scenarios and 21 dB in non-blockage scenarios. For measurements whose CNo is higher than this threshold, if a multipath bias estimate (metric b) is lesser than −30 meters (including +ve values for taking into account the real multipath bias) or if the multipath bias estimate is greater than −1000 meters (indicating a false lock and such other issues with the measurement) then the measurement is retained in the list of measurements for further processing. In an embodiment, the check for CNo is performed to remove outlier measurements for range information (for position RAIM).

In an embodiment, for non-blockage scenarios, the measurements obtained from the second information are included in the list for further processing if an absolute value of the multipath bias estimate for the corresponding measurements is greater than 100 m (for position RAIM) or 10 m/sec (for velocity RAIM). However, if the number of measurements obtained from the first information is less than 4, then all measurements obtained from the second information are removed from the list.

In an embodiment, for blockage scenarios, the measurements obtained from the second information (corresponding to the previously received information) may be more relevant and accordingly are removed from the list unless the solution provides a significantly different result from the predicted position information or when the measurements obtained from the first information have no multi-path error or preclude a free SV effect among themselves. In an embodiment, a check of f./diag(W) for the predicted position information against a threshold of 50 meters is performed to determine whether the solution is significantly different than the predicted position.

In order to check whether the measurements obtained from the first information have no multipath error, the metric s (recomputed with the first information alone) is compared with a chi-square threshold and further it is checked if the maximum position error is less than 20 m. If the metric s is less than the chi-square threshold and the maximum position error is less than 20 m, then the measurements from the second information can be included in the list, as this may be indicative of the fact that the measurement from the first information may represent non-outlier information. However, if the number of measurements obtained from the first information is less than 5, then the measurements obtained from the second information are not included in the list.

In an embodiment, the maximum position error is computed to determine if any information received from a GNSS satellite suffers from a "free SV" effect. This computation is done to ensure that there is no GNSS satellite information, which can cause large errors in the resultant position due to errors in its measurements. The "free SV effect" implies that information from a GNSS satellite is not corroborated by other satellites and, hence, is potentially suspect. In an example embodiment, the computation is performed by assuming that only one measurement obtained from the first information alone has a multipath error and then calculating the position error that would result if this were the case. Then the maximum position error is obtained from the position errors obtained for each measurement (with the same assumption) and compared against a threshold of 20 m. It is assumed that there is no noise and that only a particular measurement has multipath error and to find out the error in position due to that error is found as shown below:

$$\tilde{\rho} = \tilde{H}\Delta X + [0 \ldots \rho_i^{mp} \ldots 0]^T$$

In this case, the fault vector can be shown to be equal to $f = S[0 \ldots \rho_i^{mp} \ldots 0]^T$ but the fault vector itself is measurable and available to us. As such, we compute $s = f^T f$ to estimate $\rho_i^{mp}$ as follows:

$$\Delta X_{error}^i = (\tilde{H}^T \tilde{H})^{-1} \tilde{H}^T [0 \ldots \sqrt{s/S_i^T S_i} \ldots 0]^T$$
$$f = S[0 \ldots \rho_i^{mp} \ldots 0]^T$$
$$= S_i \rho_i^{mp}$$
$$s = f^T f$$
$$= S_i^T S_i (\rho_i^{mp})^2$$
$$\rho_i^{mp} = \sqrt{s/S_i^T S_i}$$

where $S_i$ is the "i"th column of S.

For all measurements obtained from the first information this can be computed and the maximum position error is compared against the threshold. The information received from a GNSS satellite is considered to be "free" if the maximum position error for that GNSS satellite is higher than the threshold even though the $f^T * f$ is less than the chi-square threshold, thereby implying that the position error for that GNSS satellite cannot be confirmed by measurements from other satellites and, hence, included in the list of measurements for further processing. If the free SV effect is determined to be present in the measurements corresponding to the first information, then the measurements corresponding to the second information may be removed from the list of measurements so as to determine the outlier information.

In an example embodiment, measurements obtained from the second information are removed from the list of measurements if sensitivity of position error resulting from an error in a measurement obtained from the first information is greater than a threshold. In an embodiment, the sensitivity threshold is set to 500 meters. The sensitivity of an error in a measurement corresponding to the first information to cause error in the final output position is obtained by setting $\rho_i^{mp} = wi*1$ and taking the ratio Sensitivity $$\frac{(\Delta X_{error}^i)^T \Delta X_{error}^i}{f_i^T f_i},$$

where both $\Delta X'_{error}$, $f_i$ are computed using $\rho_i^{mp} = wi*1$. If this Sensitivity is relatively high, then any the solution is highly sensitive to errors and, hence, the second information is not passed on to the next stage for potential removal/de-weighting.

Determining the presence of the outlier measurement may further include selecting a measurement, such as the outlier measurement, from the remaining list of measurements based on a maximum likelihood of error (metric m) if metrics associated with the remaining list of measurements satisfy a second predefined criterion, and a maximum multipath bias estimate (metric b), if metrics associated with measurements in the remaining list of measurements do not satisfy the second predefined criterion. In an example embodiment, the second predefined criterion is an adequate separation of the m metric of the remaining measurements in the list of measurements when the m metrics corresponding to each measurement in the remaining measurements are arranged in the descending order. In an example embodiment, the m metrics, such as, for example X and Y, corresponding to two measurements are defined to be "adequately-separated" if X>1.15*Y and X−Y>the chi-square threshold.

In one embodiment, if sorted m metric(1) and sorted m metric(2) are "adequately separated" then the measurement corresponding to sorted m metric(1) is the selected measurement. In one embodiment, however, if the second and third entries in the sorted list of m metrics are "adequately separated", it means that first and second entries are close by but are "adequately separated" from the rest, and then the measurement with the higher multipath bias estimate among the first and second highest m metrics may be selected as the outlier measurement. However, if the m metrics are not "adequately separated" then the measurement with the highest multipath bias estimate (metric b) is selected as the outlier measurement.

In an embodiment, selecting the measurement as the outlier measurement further includes checking if a multipath bias estimate of the measurement is greater than a predefined threshold, which varies between 30 m and 100 m for Position RAIM and between 2 meters/second (m/s) and 5 m/s for velocity RAIM depending on whether the conditions are benign (for example, when a large number of GNSS satellites are used for obtaining the solution) or tough (e.g., a few GNSS satellites are used for obtaining the solution) if the selected measurement is obtained from the first information. In one embodiment, the processor 406 is capable of configuring a secondary set of measurements by removing the outlier measurement from the primary set of measurements if the measurement is obtained from the first information. If the measurement corresponding to the first information is not removed because of the threshold check, then all other measurements (from the first information and the second information) are checked for the presence of a multipath error (e.g., metric s being greater than the chi-square threshold). If such a multipath check passes, then this may imply that the measurements are relatively multipath error free.

In an embodiment, the processor 406 is capable of configuring a secondary set of measurements by de-weighting the outlier measurement in the primary set of measurements if the measurement is obtained from the second information and if the remaining measurements in the primary set of measurements comprise a predefined threshold of multipath error. It is noted that de-weighting a measurement (for example, from the KF prediction) implies modifying a noise variance corresponding to a measurement and adding the multipath bias estimate to the noise variance as exemplified below:

Noise variance of state=current Noise Variance+Multipath bias_est^2

In one embodiment, the processor 406 is further configured to remove all outlier measurements by repeating the following: recomputing the solution based on the secondary set of measurements, recomputing a plurality of metrics for each measurement of the secondary set of measurements based on the recomputed solution, selecting a measurement from among the secondary set of measurements as an outlier measurement (as explained above), and revising the secondary set of measurements by one of removing and de-weighting the outlier measurement. More specifically, the processor 406 may configure the secondary set of measurements upon removing/de-weighting outlier measurement from the primary set of measurements. The processor 406 may perform the chi-square test to check for a presence of error, such as a multipath error, in the secondary set of measurements. If the presence of the error is determined in the secondary set of measurements, then the solution is recomputed based on the configured secondary set of measurements and the outlier measurement is determined (as explained above). The outlier measurement may be removed/de-weighted from the secondary set of measurements and a new set of measurements may be configured. This process may be repeated until the measurements obtained from the first information and the second information are substantially free from error and the information may be subsequently utilized for computation of position information (e.g., a current position and velocity).

In one embodiment, the processor 406 is configured to remove/de-weight the outlier measurements corresponding to the range information; this is followed by removing/de-weighting the outlier measurements corresponding to the velocity information. In one embodiment, the processor 406 is configured to provide the measurements (from the first information and the second information) after removing outlier measurements corresponding to the range information and the velocity information to the prediction module 404 for correcting the current position information and predicting the future position information.

As explained above, de-weighting a measurement (for example, from the KF prediction) implies modifying a noise variance corresponding to a measurement and adding the multipath bias estimate to the noise variance. In an example embodiment, Q matrix, representing the process noise in the Kalman Filter, is increased if certain conditions are met. For example, these conditions include checks on whether the first set of measurements are multipath affected or not (based on the chi-square test), the Sensitivity of the measurements being less than a threshold, a maximum position error from these measurements (as discussed above), the availability of a number of non-outlier measurements, the CNo (Carrier to Noise ratio in dB) of the non-outlier Satellites and the like.

In an example embodiment, increasing the noise variance on a measurement corresponding to the second information may imply increasing an uncertainty (for example, in the covariance matrix of the KF states) for that particular measurement while relying more on the remaining measurements in the second information. For example, if the measurement corresponding to an east direction is found out to be de-weighted during position RAIM, then the measurements corresponding to the north direction, altitude and clock information may still be valid and, accordingly, used for determination of the position information. The de-weighting of the measurement is explained further in FIGS. 5A and 5B.

Figure 5A:
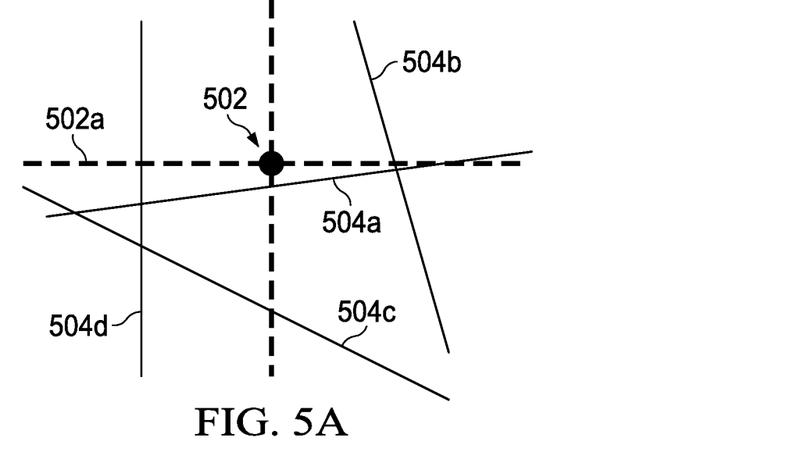
FIGS. 5A and 5B depict example of measurements obtained from the second information without outlier measurement and with outlier measurement, respectively, according to an embodiment.
Figure 5B:
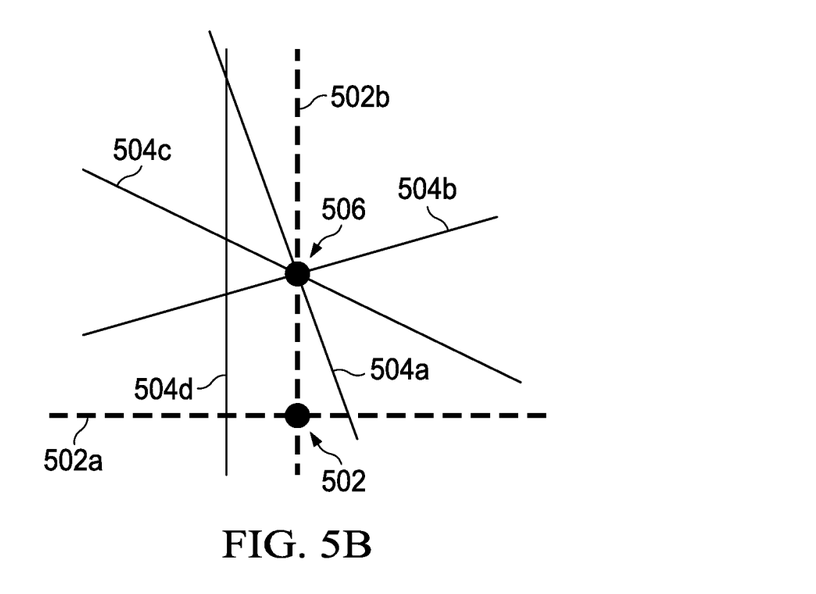

FIGS. 5A and 5B depict examples of measurements obtained from the second information without an outlier measurement and with an outlier measurement, respectively, according to one embodiment. In FIGS. 5A and 5B, point 502 represents the predicted position corresponding to the second information and lines 502a and 502b (representing the X and Y axis) with point 502 at the intersection represent the linearized measurements obtained from the second information. The lines 504a, 504b, 504c and 504d depict a linearized form of pseudo-range measurements corresponding to four GNSS satellites, such as the GNSS satellites 106a-106d. Each of the lines 504a, 504b, 504c and 504d correspond to information received from a GNSS satellite from among the plurality of GNSS satellites. The lines 502a and 502b representing linearized form of measurements corresponding to the second information seem to be substantially in consensus with the measurement represented by line 504a and further away from the outlier measurements represented by lines 504b-504d, The measurements included in the second information are considered to be relatively free from outlier measurements in such a case.

In FIG. 5B, the lines 504a-504c representing a linearized form of measurements received from the first information intersect at a point 506 representing a consensus among the received information. The line 502a of the lines 502a and 502b representing the linearized form of measurements (corresponding to the predicted position represented by point 502) received from the second information passes through the point 506. The line 504d (corresponding to a measurement from the first information) and the line 502b (X-axis corresponding to a measurement from the second information) are farther away from the consensus point 506 and may be considered outlier measurements. The measurement corresponding to the line 504d may be removed and the measurement corresponding to the line 502b from the second information may accordingly be de-weighted as explained in FIG. 4, from the determination of the position information.

It should be noted that some of the features described in this specification have been presented as modules (e.g., the prediction module), in order to more particularly emphasize their implementation independence. A block may be implemented as a hardware circuit comprising custom very large scale integration (VLSI) circuits or gate arrays, off-the-shelf semiconductors such as logic chips, transistors, or other discrete components. A module may also be implemented in programmable hardware devices, such as field programmable gate arrays, programmable array logic, programmable logic devices, graphics processing units, and the like.

A module may also be at least partially implemented in software for execution by various types of processors. An identified module of executable code may, for instance, comprise one or more physical or logical modules of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

The processor 406 may be embodied as a multi-core processor, a single core processor; or combination of multi-core processors and single core processors. For example, the processor 406 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit, a hardware accelerator, a special-purpose computer chip, or the like. As such, whether configured by hardware or software methods, or by a combination thereof, the processor 406 may represent an entity, for example, physically embodied in circuitry, capable of performing operations according to various embodiments while configured accordingly.

The flowchart diagrams that follow are generally set forth as logical flowchart diagrams. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 6:
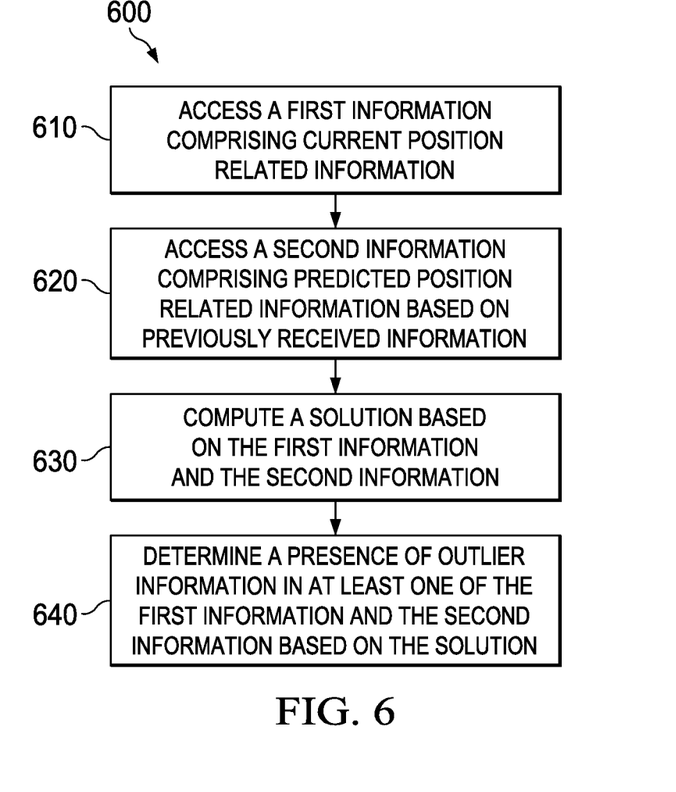
FIG. 6 is a flow diagram of a first exemplary method for performing receiver autonomous integrity monitoring (RAIM) in GNSS receivers, according to an embodiment.

FIG. 6 is a flow diagram of a first exemplary method 600 for performing receiver autonomous integrity monitoring (RAIM) in GNSS receivers, according to an embodiment. In certain embodiments, operations of method 600 may be performed by the GNSS receiver 102 explained in FIG. 2. At 610 of the method 600 a first information comprising current position related information is accessed (for example, from the signal receiving module 402 of the GNSS receiver 102). In one example embodiment, the first information may include the position related information in form of range information and velocity information from each GNSS satellite of the plurality of GNSS satellites.

At 620, a second information comprising predicted position related information based on previously received information is accessed (for example, from the prediction module 404 of the GNSS receiver 102). In an example embodiment, the predicted position related information comprises a Kalman filter (KF) prediction based on previously received information from the plurality of GNSS satellites. In one example embodiment, the predicted position information may include information regarding a current estimate of position and velocity. In one example embodiment, the predicted position information may include information regarding a current estimate of position and velocity.

At 630, a solution is computed based on the first information and the second information (for example, by the processor 406 of the GNSS receiver 102). At 640, a presence of outlier information is determined in at least one of the first information and the second information based on the solution (for example, by a processor 406 of the GNSS receiver 102).

In one embodiment, for determining the outlier information, the method 600 includes obtaining measurements from each of the first information and the second information. In one embodiment, each measurement of the measurements obtained from the first information corresponds to received information from a GNSS satellite of the plurality of GNSS satellites (as explained in FIG. 4). In one embodiment, the information included in the second information, such as KF prediction, may be linearized to obtain measurements from the second information (as explained in FIG. 4).

In an embodiment, determining the position information may further include forming a primary set of measurements (for example, by processor 406) by including at least one measurement obtained from the first information and at least one information obtained from the second information. In an example embodiment, measurements corresponding to only range information from the first information and the second information are included to form the primary set of measurements. In another example embodiment, measurements corresponding to only velocity information from the first information and the second information are included to form the primary set of measurements. In one embodiment, only some measurements corresponding to the first information and all the measurements obtained from the second information are included in the primary set of measurements.

In one embodiment, determining the position information may further include computing a solution based on the primary set of measurements. A plurality of metrics for each measurement of the primary set of measurements may further be computed based on the solution. In an example embodiment, the plurality of metrics are configured to determine at least one of a presence of error in the primary set of measurements (for example, metric s of FIG. 4), a likelihood of error in a measurement (for example, metric m of FIG. 4) and an estimate of the error in a measurement (for example, metric b of FIG. 4) if the presence of the error in the measurement comprises is determined.

In an embodiment, determining the outlier information may include determining a presence of an outlier measurement in the primary set of measurements based on the plurality of metrics associated with the each measurement. In an example embodiment, determining the presence of the outlier measurement may include preparing a list of measurements that comprise error from the primary set of measurements based on the plurality of metrics. In an example embodiment, at least one measurement is removed from the list of measurements based on a first predefined criterion. In an example embodiment, the predefined criterion the first predefined criterion for removing the at least one measurement from the list of measurements is a presence of a predefined measure of multipath error in a measurement of the list of measurements. In an example embodiment, the predefined measure may be a negative multipath bias estimate for a measurement in the list of measurements. In an embodiment, the predefined measure may be a CNo (corresponding to a measurement) greater than a threshold for a pre-determined estimate of multipath bias estimate (as explained in FIG. 4)

In an example embodiment, measurements obtained from the second information are removed from the list of measurements if a maximum position error computed for measurements obtained from the first information is greater than a threshold. The maximum position error computed for each measurement may be compared against a threshold of 20 m and if the maximum position error is higher than the threshold than the GNSS satellite corresponding to the measurement may be considered to "free SV". If the measurements obtained from the first information are determined to include the free SV effect, then the measurements corresponding to the second information are removed from the list of measurements.

In an example embodiment, measurements obtained from the second information are removed from the list of measurements if sensitivity of position error on account of error in a measurement obtained from the first information is greater than a threshold. If this Sensitivity is very high, then any the solution is highly sensitive to errors and hence the second information is not passed on to the next stage for potential removal/de-weighting.

In an embodiment, determining the presence of the outlier measurement may further include selecting a measurement as the outlier measurement from the remaining list of measurements based on a maximum likelihood of error (for example, metric m) if metrics associated with the remaining list of measurements satisfy a second predefined criterion, and, a maximum multipath bias estimate (for example, metric b) if metrics associated with measurements in the remaining list of measurements do not satisfy the second predefined criterion. In an example embodiment, the second predefined criterion is an adequate separation of the m metric of the remaining measurements in the list of measurements when the m metric corresponding to each measurement in the remaining measurements are arranged in the descending order. In an example embodiment, the m metrics, for example X and Y, corresponding to two measurements are defined to be "adequately-separated" if X>1.15*Y and X−Y>chi-square threshold.

In one embodiment, if sorted m metric(1) and sorted m metric(2) are "adequately separated" then the measurement corresponding to sorted m metric(1) is the selected measurement. In an alternate embodiment, if the second and third entries in the sorted list of m metrics are "adequately separated", it means that first and second entries are close by but are "adequately separated" from the rest, then the measurement with the higher multipath bias estimate among the first and second highest m metrics may be selected as the outlier measurement. However, if the m metrics are not "adequately separated" then the measurement with the highest multipath bias estimate (metric b) is selected as the outlier measurement.

In an embodiment, selecting the measurement as the outlier measurement further includes checking if a multipath bias estimate of the measurement is greater than a predefined threshold if the selected measurement is obtained from the first information. In one embodiment, a secondary set of measurements is configured (for example, by processor 406) by removing the outlier measurement from the primary set of measurements if the measurement is obtained from the first information. In another embodiment, a secondary set of measurements may be configured by de-weighting the outlier measurement in the primary set of measurements if the measurement is obtained from the second information and if the remaining measurements in the primary set of measurements comprise a predefined threshold of error, for example multipath error.

As explained above, de-weighting a measurement (for example, from the KF prediction) implies modifying a noise variance corresponding to a measurement and adding the multipath bias estimate to the noise variance. In an example embodiment, Q matrix, representing the process noise in the Kalman Filter, is increased if certain conditions are met. For example, these conditions include checks on whether the first set of measurements are multipath affected or not (based on the chi-square test), the Sensitivity of the measurements being less than a threshold, maximum position error from these measurements (as discussed above), availability of number of non-outlier measurements, the CNo (Carrier to Noise ratio in dB) of the non outlier Satellites and the like.

In an embodiment, removing all outlier measurements by repeating: recomputing the solution based on the secondary set of measurements, recomputing a plurality of metrics for each measurement of the secondary set of measurements based on the recomputed solution; selecting a measurement of the secondary set of measurements as an outlier measurement, and revising the secondary set of measurements by one of removing and de-weighting the outlier measurement.

In one embodiment, all the outlier measurements corresponding to the range information may be one of removed and de-weighted followed by removing/de-weighting all the outlier measurements corresponding to the velocity information. In one embodiment, the measurements (from the first information and the second information) after removing outlier measurements corresponding to the range information and the velocity information may be utilized (for example, by the prediction module 404) for correcting the current position information and predicting the future position information.

Figure 7:
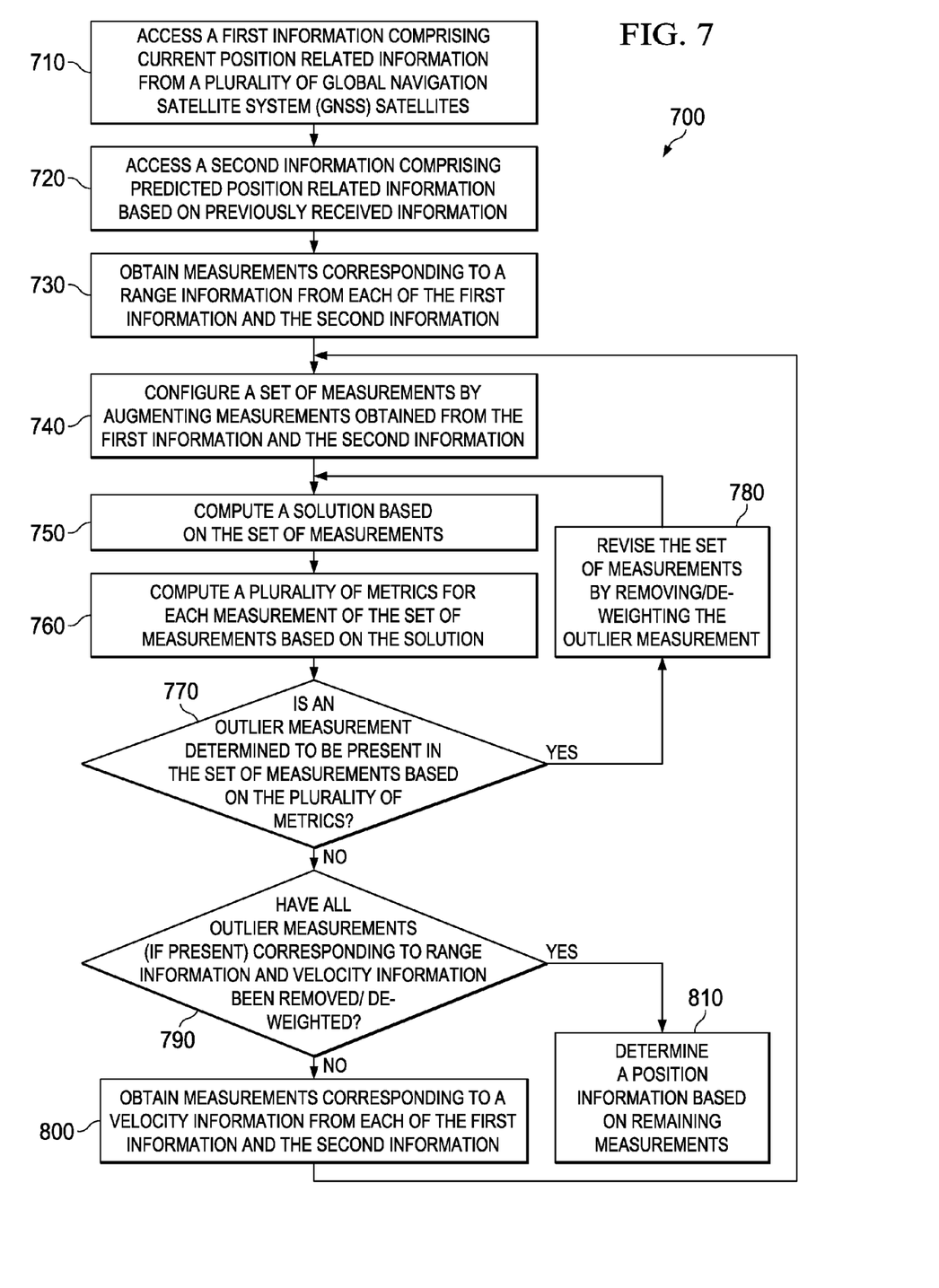
FIG. 7 is a flow diagram of a second exemplary method for performing receiver autonomous integrity monitoring (RAIM) in GNSS receivers, according to an embodiment.

FIG. 7 is a flow diagram of a second exemplary method 700 for performing RAIM in GNSS receivers, according to an embodiment. At 710 of the method 700, a first information comprising current position related information is accessed from a plurality of global navigation satellite system (GNSS) satellites. At 720, a second information comprising predicted position related information based on previously received information is received. At 730, measurements corresponding to a range information are obtained from each of the first information and the second information (as explained in FIG. 4). At 740, a set of measurements, such as the primary set of measurements, is configured by including at least one measurement obtained from the first information and at least one information obtained from the second information. At 750, a solution is computed based on the set of measurements (as explained in FIG. 4). At 760, a plurality of metrics, such as the metrics s, b and m, is computed for the set of measurements based on the solution.

At 770, it is determined whether an outlier measurement is present in the set of measurements based on the plurality of metrics. If it is determined that an outlier measurement is present (as explained in FIG. 4), then 780 is performed. At 780, the set of measurements is revised by removing/de-weighting the outlier measurement and 750, 760 and 770 are repeated until outlier measurements corresponding to the range information are determined. If it is determined that no outlier measurement is present in the set of measurements, then 790 is performed. At 790, it is checked whether all outlier measurements (if present) corresponding to the range information and velocity information been removed/de-weighted. If all the outlier measurements have not been determined, then 800 is performed. At 800, measurements corresponding to a velocity information are obtained from each of the first information and the second information and 740-790 are repeated until outlier measurements corresponding to the range information and the velocity information are determined. At 810, a position information is determined based on remaining measurements (measurements left after removing/de-weighting all outlier measurements corresponding to range information and velocity information) from the set of measurements. The computation of the position information based on measurements from the first information (GNSS satellite received information) and the second information (previously received information in form of KF prediction) is not explained for the sake of brevity of description and as the computation logic is known in the relevant arts.

As described above, the systems, devices (i.e., apparatuses) and methods of the present disclosure include solutions for performing RAIM in GNSS receivers, such as the GNSS receiver 102. It should be appreciated, therefore, that the present disclosure discloses several features that enable the GNSS receiver to perform RAIM by combining the current information received from the GNSS satellites with previously received information in form of KF prediction to enable the determination of the position information in form of current position and velocity estimates, Performing RAIM in such a manner provides significant performance improvement especially in areas like urban canyons and blockages, which are affected by both low visibility of satellites and error due to multipath. In the disclosed RAIM, the determination of outlier measurements among the received information is configured to provide adjustable weightage to the current GNSS satellite information and the previously information based on current situation, such that the determination of the position information is not affected. For example, in blockages, since there is hardly any visibility of the GNSS satellites, the de-weighting of any measurement from the second information may be precluded until the visibility of satellites improves. On the other hand, if it determined that the visibility of satellites is high and that the received information from the GNSS satellites is relatively multipath error free, then the de-weighting of some of the information from the second information may be performed.

The disclosed RAIM also precludes occurrence of avalanche effect by enabling identification of KF states in error and enabling de-weighting of those states. For example, if we have drifted along east direction, then information along north, altitude and clock bias information are all still valid and may accordingly be utilized for determining the position information along with current GNSS satellite information.

The disclosed RAIM may also enable inclusion of additional information, for example, sensor measurements like acceleration, gyrometer, altitude sensor and WiFi positions, as extra measurements in the primary set of measurements to improve overall consistency. Further, extraneous information, for example a positiveness of multipath may also be added to the primary set of measurements.

Embodiments of the present disclosure include one or more computer programs stored or otherwise embodied on a computer-readable medium, the computer programs being configured to control a processor to perform one or more operations. A computer-readable medium storing, embodying, or encoded with a computer program, or similar language, may be embodied as a tangible data storage device storing one or more software programs that are configured to control a processor to perform one or more operations. Said operations may be, for example, any of the steps or operations described herein (for example, those performed by the signal receiving module 402, prediction module 404 and the processor 406). Additionally, a tangible data storage device may be embodied as one or more volatile memory devices, one or more nonvolatile memory devices, and/or a combination of one or more volatile memory devices and nonvolatile memory devices.

In an embodiment, the computer-readable medium is configured to store a set of instructions that when executed cause a computer to perform a method, such as the method 700. In an embodiment, the method includes accessing a first information comprising current position related information from a plurality of global navigation satellite system (GNSS) satellites, and, accessing a second information comprising predicted position related information based on previously received information. The method further includes obtaining measurements from each of the first information and the second information. Each measurement of the measurements obtained from the first information corresponds to received information from a GNSS satellite of the plurality of GNSS satellites. A solution is computed based on at least one measurement obtained from each of the first information and the second information and a presence of outlier information corresponding to range information and velocity information is determined in at least one of the first information and the second information based on the solution. The method further includes determining position information based on one of removing and de-weighting the outlier information.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A process comprising:
  A. receiving first information from navigation satellites in an electronic device, the first information indicating current position of the electronic device;
  B. accessing second information from memory circuitry in the electronic device, the second information indicating previous position of the electronic device based on first information from the navigation satellites that was previously received;
  C. computing first measurements in the electronic device based on the first information;
  D. computing second measurements in the electronic device based on the second information;
  E. determining a presence of outlier measurements in the first measurements and the second measurements;
  F. removing any outlier measurement from the first measurement; and
  G. de-weighting any outlier measurement in the second measurements.

2. The process of claim 1 in which the receiving includes receiving current position related information from global navigation satellite system (GNSS) satellites.

3. The process of claim 1 in which the accessing includes accessing predicted position related second information based on previously received first information.

4. The process of claim 1 in which the computing first measurements includes computing first range information from the first information.

5. The process of claim 1 in which the computing first measurements includes computing first range information from the first information.

* * * * *